(No Model.)
W. C. CODDINGTON.
Vulcanite Fiber Cutter.
No. 233,205. Patented Oct. 12, 1880.
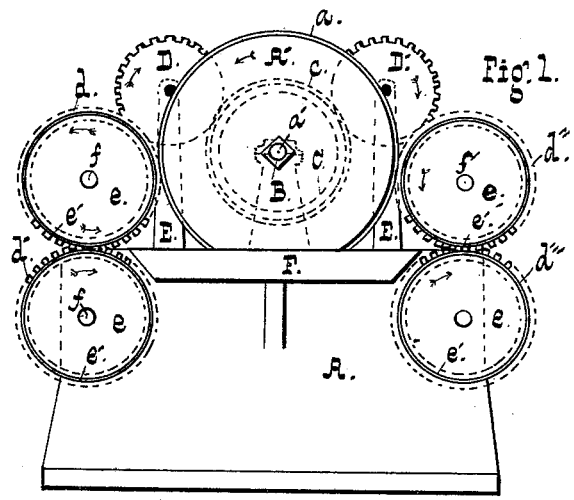
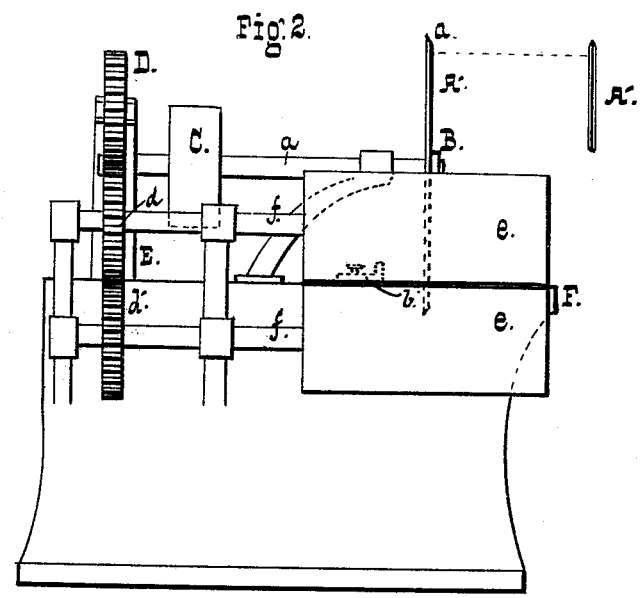
Witnesses,
W. A. Bertram,
L. H. Barclay.
Inventor,
W. C. Coddington,
by
Attorney.

UNITED STATES PATENT OFFICE.

WILLIAM C. CODDINGTON, OF BALTIMORE, MARYLAND, ASSIGNOR OF ONE-HALF OF HIS RIGHT TO SAMUEL G. B. COOK, OF SAME PLACE.

VULCANITE-FIBER CUTTER.

SPECIFICATION forming part of Letters Patent No. 233,205, dated October 12, 1880.

Application filed September 13, 1880. (No model.)

*To all whom it may concern:*

Be it known that I, WILLIAM C. CODDINGTON, of Baltimore city, State of Maryland, have invented certain new and useful Improvements in Vulcanite-Fiber Cutters; and I hereby declare the same to be fully, clearly, and exactly described as follows, reference being had to the accompanying drawings, in which—

Figure 1 is a front, and Fig. 2 an end, elevation of the device.

My invention has for its object to furnish a machine for cutting the material known as "vulcanite fiber," now so generally used in the arts. Owing to the exceeding toughness and hardness of this material it has heretofore been necessary to saw it into shape—a process which resulted in considerable waste, besides leaving a rough and unfinished edge which required trimming.

I have succeeded in an endeavor to sever the material by a clean cut, admitting of the construction of many articles without any waste and very expeditiously. This end I attain by means of the machine illustrated in the accompanying drawings, and which I will proceed to describe.

A is the main frame, having bearings, in which is mounted a shaft, $a$, that carries at its outer end the revolving circular cutter A', which is secured upon the shaft by means of a nut, B.

The cutter A' consists of a circular plate of steel having its edge beveled from one or both sides, as shown. This will be determined by the nature of the cut which it is desired to make. If the edge of the material is to be truly at right angles with its face, the cutter with a single bevel is to be used; but for ordinary use the other is to be preferred, as the material is more readily guided and directed when using it.

On the shaft $a$ is a pulley, C, for the driving-belt, and a gear-wheel, $c$. (Shown in dotted lines.)

The wheel $c$ meshes with two wheels, D and D', that are mounted in bearings on the supports E, and the wheels D D' mesh with wheels $d\,d''$ on the shafts $f\,f'$. These latter carry the rollers $e$, having a rubber or equivalent yielding but tenacious cover, $e'$.

Wheels $d'\,d'''$ on the shafts of the lower rollers are driven by the wheels $d\,d''$, the direction in which they revolve being indicated by arrows.

F is the table, having a slot in which the disk or cutter A' turns, and it is provided with guides or gages $b$, (shown in dotted lines,) whereby the distance of the cut from the edge of the sheet is regulated.

In operation, the sheet of vulcanite fiber is fed in between the rollers $e$, which gripe it and carry it toward the disk A', the whole system of wheels and the disk being caused to turn by means of a belt led over the pulley C. The revolving disk shears the fiber with a clean cut, and the sheet and the severed portion are seized by the rollers on the opposite side and drawn along, preventing the sheet from buckling.

As the shafts of the rollers are unconnected on the outer side, a strip may be cut from the edge of a sheet of indefinite width.

A clutch may be arranged on the shaft $a$, whereby the motions of the parts may be instantly reversed, and the sheet may be passed back and forth under the cutter, and such a device will be found convenient in case a sheet of fiber is to be cut up into strips.

I am aware that rotary cutting-disks are not, broadly, new, such having long been used, for instance, for cutting india-rubber into filaments, and such I do not claim; but What I do claim is—

1. In a machine for cutting vulcanite fiber, a rotating cutting-disk having a beveled edge, and mechanism combined therewith, substantially as set forth, for feeding the sheet of fiber to the disk.

2. In a machine for cutting vulcanite fiber, a rotating cutting-disk having a beveled edge, and a pair of feed-rollers adapted to gripe the sheet and feed it to the disk, as set forth.

3. In a machine for cutting vulcanite fiber, a rotating cutting-disk, in combination with feed and delivering mechanism adapted to feed and draw the sheet, as set forth.

4. In combination with the cutting-disk, the feed-rollers and delivery-rollers adapted to gripe the sheet and pass it under the disk, as set forth.

5. In combination with the cutting-disk, the feed and delivery rollers having the outer ends of their shafts unattached, as set forth.

6. In combination with the cutting-disk and slotted table, the feed-rollers, arranged and operating as set forth.

WILLIAM C. CODDINGTON.

Witnesses:
JNO. T. MADDOX,
R. D. WILLIAMS.